United States Patent
Nania (10) Patent No.: US 9,278,610 B2
(45) Date of Patent: Mar. 8, 2016

(54) VEHICLE ANTI-PINCH MOONROOF CONTROL SYSTEM AND METHOD

(71) Applicant: Ford Global Technologies, LLC, Dearborn, MI (US)

(72) Inventor: Adrian Nania, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/304,726

(22) Filed: Jun. 13, 2014

(65) Prior Publication Data

US 2015/0360545 A1    Dec. 17, 2015

(51) Int. Cl.
*B60J 3/00* (2006.01)
*B60J 7/06* (2006.01)
*B60J 7/057* (2006.01)

(52) U.S. Cl.
CPC . *B60J 7/06* (2013.01); *B60J 7/0573* (2013.01)

(58) Field of Classification Search
CPC .................................. B60J 7/06; B60J 7/0573
See application file for complete search history.

(56) References Cited

U.S. PATENT DOCUMENTS

| | | | |
|---|---|---|---|
| 5,390,975 A * | 2/1995 | Stephens | 296/211 |
| 6,186,586 B1 | 2/2001 | Lindinger | |
| 6,592,178 B2 | 7/2003 | Schober et al. | |
| 8,282,157 B2 | 10/2012 | Kato et al. | |
| 2005/0051285 A1* | 3/2005 | Yano et al. | 160/370.22 |
| 2006/0237152 A1* | 10/2006 | Hansen et al. | 160/370.22 |
| 2006/0255627 A1* | 11/2006 | Hirotani et al. | 296/214 |
| 2011/0266839 A1* | 11/2011 | Sasaki et al. | 296/219 |
| 2013/0061523 A1 | 3/2013 | Mankame et al. | |

FOREIGN PATENT DOCUMENTS

JP    2002096640 A    4/2002

\* cited by examiner

*Primary Examiner* — Lori L Lyjak
(74) *Attorney, Agent, or Firm* — James P. Muraff; Neal, Gerber & Eisenberg LLP

(57) ABSTRACT

Systems and methods are provided for a vehicle roof closure that can prevent pinching of obstructions within a roof opening. Example vehicles include a roof having an opening, a panel disposed adjacent to the opening and moveable by a first motor, a shade disposed below the panel and moveable by a second motor having a lower output than the first motor, and a controller configured to close the shade before closing the panel during a close panel operation, and stop the shade if an obstruction is detected within the opening. Example methods include upon receiving a command to close a panel over an opening, causing a shade motor to start closing a shade disposed below the panel by unrolling the shade; stopping the shade motor upon detection of an obstruction within the opening; and causing a panel motor to start closing the panel upon receiving a shade closed signal.

18 Claims, 7 Drawing Sheets

VEHICLE ANTI-PINCH MOONROOF CONTROL SYSTEM AND METHOD

TECHNICAL FIELD

This application generally relates to vehicle moonroofs or sunroofs and more specifically, to anti-pinch systems for moonroofs or sunroofs.

BACKGROUND

Commercially available vehicles can include a sunroof or moonroof with one or more moveable elements for exposing or covering an opening in the roof of the vehicle. Additionally, conventional sunroof or moonroof assemblies include an anti-pinch sensor for detecting an obstruction or obstacle in the closing path of the moveable element, in accordance with federal regulations. As will be appreciated, the terms moonroof and sunroof are interchangeable and any reference herein to one of the terms is intended to apply to the other as well.

Figures 1A, 1B:
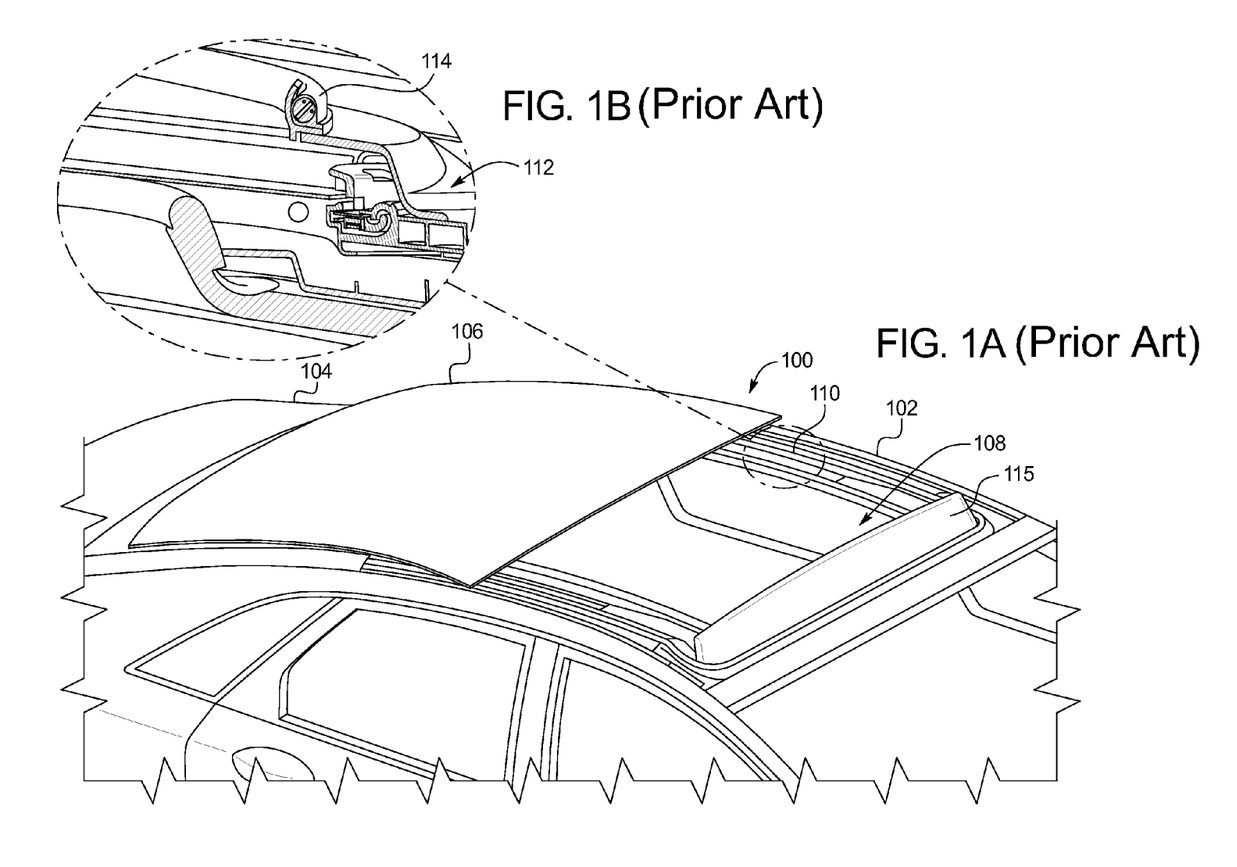
FIG. 1A depicts a conventional vehicle moonroof system.
FIG. 1B depicts a detailed view of a selected portion of the system shown in FIG. 1A.

FIG. 1A depicts one example of an existing moonroof assembly 100 located in a roof 102 of a vehicle body 104. The moonroof assembly 100 includes a moveable element 106 for covering or exposing an opening 108 within the roof 102. In the illustrated example, the moveable element 106 is an at least partially transparent glass panel that is actuated by a motor (not shown) to move fore and aft between a closed position and an open position with respect to the opening 108. The moonroof assembly 100 further includes a roof frame 110 that extends around the opening 108, so as to form a ring. FIG. 1B depicts a detailed view of the roof frame 110, which includes a moonroof track 112 for supporting the moveable element 106 during movement. The roof frame 110 also includes one or more anti-pinch sensors 114 positioned adjacent to the moonroof track 112 for detecting an obstruction within the opening 108 during a closing operation of the moveable element 106. The anti-pinch sensors 114 follow the track 112 around the roof frame 110, so as to also form a ring around the opening 108. When in the closed position, the moveable element 106 adjoins a front beam 115 of the roof 102 located adjacent to a front end of the roof opening 108.

Anti-pinching systems like the illustrated system require a higher level of complexity and cost to ensure proper positioning of the sensors. For example, proper positioning of a ring of anti-pinch sensors requires analyzing the interactions between the sensors located at the side rails and at the front and rear beams of the moonroof track. Further, the roof frame must be extended to accommodate or support the anti-pinch sensors. This can cause the roof frame to occupy a larger portion of the roof opening, which decreases the viewing area or daylight opening provided by the moonroof.

SUMMARY

This application is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

One example embodiment provides a vehicle comprising a roof having an opening, a panel disposed adjacent to the opening and moveable by a first motor, a shade disposed below the panel and moveable by a second motor having a lower output than the first motor, and a controller that is configured to close the shade before closing the panel during a close panel operation, and stop the shade if an obstruction is detected within the opening.

Another example embodiment provides a method of controlling a vehicle roof closure using a processor, the method including upon receiving, at the processor, a command to close a panel over an opening, causing a shade motor to start closing a shade disposed below the panel by unrolling the shade. The method further includes stopping the shade motor upon detection of an obstruction within the opening and causing a panel motor to start closing the panel upon receiving a shade closed signal.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to the object or "a" and "an" object is intended to denote also one of a possible plurality of such objects.

Figure 2A:
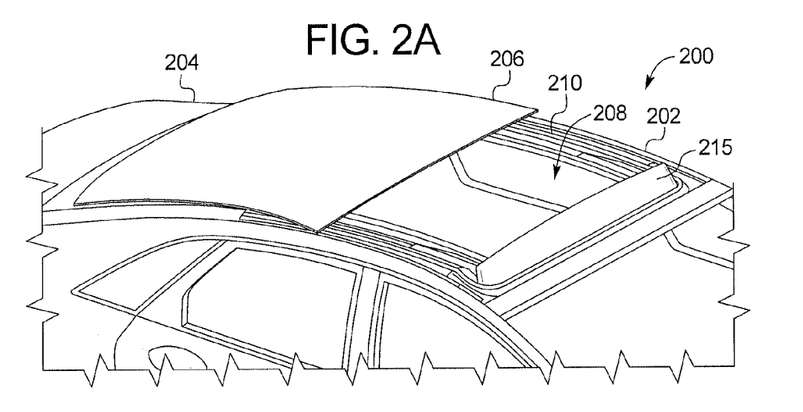
FIG. 2A depicts a top perspective view of an example vehicle moonroof assembly in a first operational state, according to embodiments.
Figure 2B:
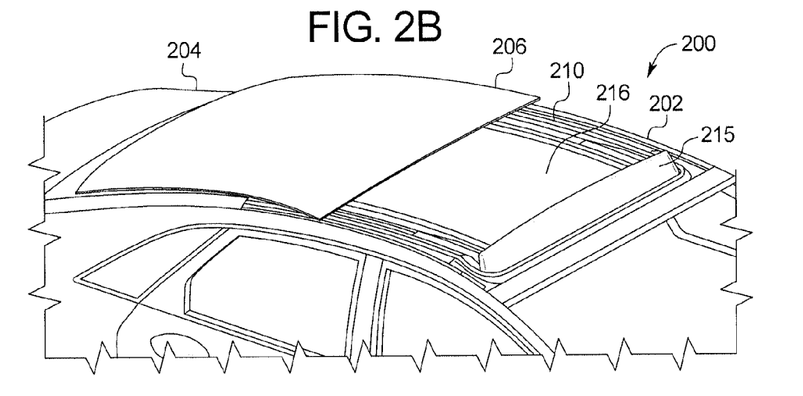
FIG. 2B depicts a second operational state of the moonroof assembly shown in FIG. 2A, according to embodiments.
Figure 2C:
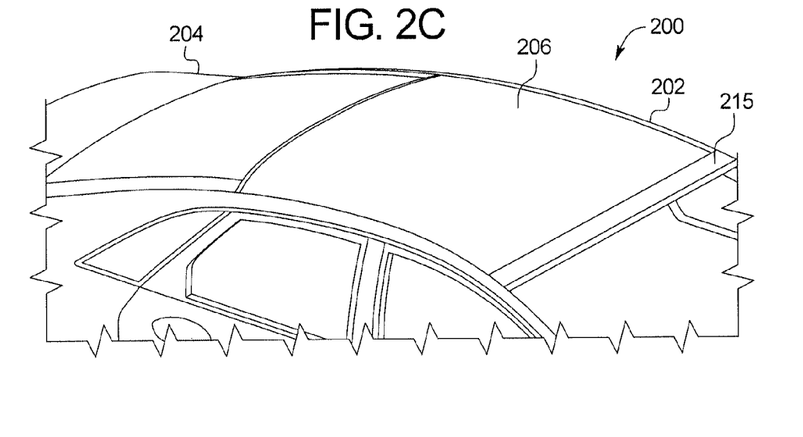
FIG. 2C depicts a third operational state of the moonroof assembly shown in FIG. 2A, according to embodiments.
Figures 3A, 3B:
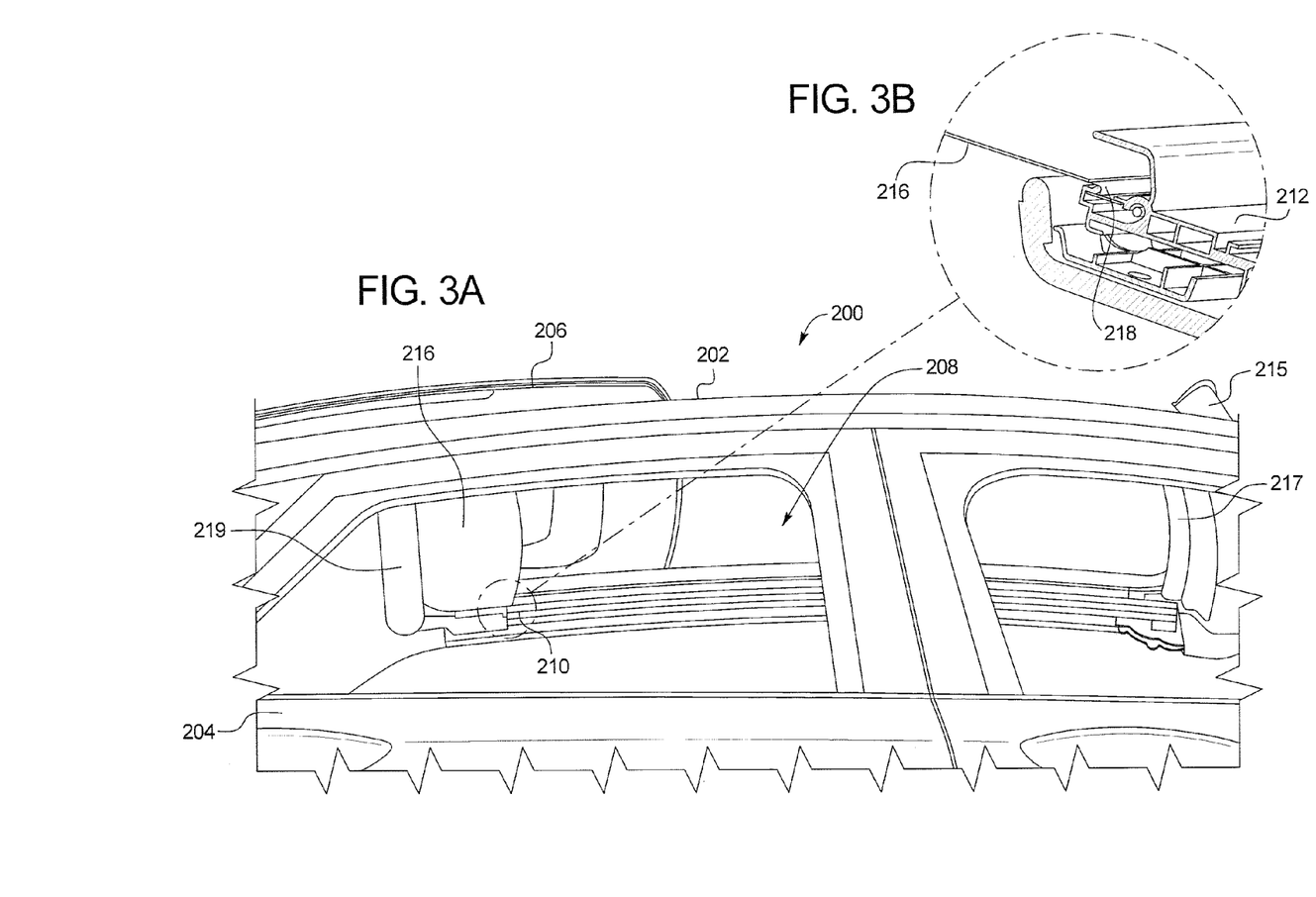
FIG. 3A depicts a bottom perspective view of the moonroof assembly shown in FIG. 2A.
FIG. 3B is a detailed view of a selected portion of the moonroof assembly shown in FIG. 3A.

FIGS. 2 and 3 depict an exemplary vehicle moonroof assembly 200 according to embodiments. Specifically, FIGS. 2A-2C show a top perspective view of the moonroof assembly 200 in various operational states, as will be discussed below. FIG. 3A shows a bottom perspective view of the moonroof assembly 200 while in the operational state shown in FIG. 2A. And FIG. 3B shows a detailed view of a highlighted portion of the moonroof assembly 200, as will be discussed below. The moonroof assembly 200 may be implemented on a roof 202 of any suitable type of vehicle 204. As illustrated, the moonroof assembly 200 includes a moveable panel 206 disposed adjacent to an opening 208 of the roof 202 for covering or uncovering the opening 208. The roof 202 includes a frame 210 for supporting the moveable panel 206. For example, as shown in FIG. 3B, the frame 210 can include a track 212 for supporting and guiding a movement of the panel 206. The panel 206 may be moved fore and aft by a panel motor (not shown) between an open position, as shown in FIGS. 2A, 2B, and 3A, and a closed position, as shown in FIG. 2C. When in the closed position, the panel 206 adjoins or abuts a front beam 215 of the roof 202 located adjacent to a front end of the roof opening 208. In embodiments, the moveable panel 206 has a rigid structure and is composed of glass and/or any other material suitable for the vehicle roof 202. In some cases, the panel 206 is at least partially transparent.

As shown in FIGS. 2B, 3A, and 3B, the moonroof assembly 200 further includes a moveable shade 216 disposed below the panel 206. In some embodiments, the shade 216 may be positioned below the opening 208, and the panel 206 may be disposed above the opening 208. In other embodiments, one or more of the panel 206 and the shade 216 may be disposed within the opening 208. Other positions of the panel 206 relative to the opening 208 are contemplated, so long as the vehicle interior is sealed from external elements when the panel 206 is the closed position.

The moveable shade 216 can provide a protective barrier for a vehicle cabin prior to, or instead of, closing the panel 206. In embodiments, the shade 216 may be a sunshade that at least partially blocks direct sunlight in order to cool the vehicle cabin temperature and to keep the sun out of passengers' eyes. In some cases, the shade 216 may be at least partially transparent, or light-filtering, to allow some daylight to enter the vehicle cabin when the shade 216 is in the closed position. In other cases, the shade 216 may be substantially opaque, or light-blocking, to prevent daylight from entering the vehicle cabin when the shade 216 is in the closed position. The shade 216 may block or filter sunlight entering through the opening 208 (for example, when the panel 206 is open) or through the panel 206 (for example, when the panel 206 is closed).

In embodiments, the moveable shade 216 has a less rigid, or more flexible, construction than the panel 406, which allows the shade 216 to at least partially flex or bend upon encountering an obstruction or obstacle. As an example, the shade 216 may be made from a flexible fabric, such as, polysilk or other suitable materials, and/or may include one or more at least partially flexible support rods, cables, or the like. Due to this flexible feature, a reduced amount of force is exerted on any obstruction within the path of the shade 216, thus reducing the effects of any accidental pinching of obstructions caused by the shade 216.

In the illustrated embodiment, the shade 216 is a rollable or roll-up power shade that is controlled by a shade motor (not shown) to unroll into a closed position for covering the opening 208, as shown in FIG. 2B, or to roll up into an open position for uncovering the opening 208, as shown in FIG. 3A. When in the closed position, a front edge of the shade 216 adjoins or abuts a front rail 217 of the roof 202 located adjacent to the front end of the roof opening 208 and below the front beam 215 for receiving the panel 206. As shown in FIG. 3A, the shade 216 includes a back end secured to a reel 219 that is powered by the shade motor to rotate clockwise (e.g., for unrolling or closing the shade 216) and counter-clockwise (e.g., for rolling up or opening the shade 216). As will be appreciated, when the shade 216 is in the open position, a majority portion of the shade 216 may be wrapped around the reel 219. And when the shade 216 is in the open position, a majority portion of the shade 216 may be extended across the opening 208.

In some cases, the shade 216 further includes a front end coupled to, or including, a front bar (not shown) to keep the front end of the shade taunt. The front bar may be thin and made of a lightweight material (e.g., aluminum) to avoid adding excess weight to the shade 216. In embodiments, one or more cables (not shown) run lengthwise along the shade 216 and are coupled at one end to the front bar of the shade 216 through couplers and at an opposing end to a torsion spring (not shown) included in or adjacent to the rotatable reel 219. In such embodiments, the shade 216 is closed by pushing the cables forward (e.g., towards the front rail 217) using the rotatable reel 219. Further, the torsion spring creates and maintains tension within the shade 216 in a lengthwise (or x-axis) direction, and this same tension causes the shade 216 to roll up (or open) when the cables are moved or pulled in the opposite direction (e.g., away from the front rail 217) by the rotatable reel 219. As shown in FIG. 3B, the shade 216 can include a pair of opposing sides respectively coupled to opposing side rails 218 of the roof frame 210. In embodiments, the side rails 218 are configured to slidably receive the sides of the shade 216 as the shade 216 is moved fore and aft lengthwise across the opening 208. The shade 216 may be secured to the side rails 218 so as to keep the shade 216 taunt (e.g., by creating tension in the shade 216 along a cross-wise or y-axis direction), thereby preventing any sagging in a center portion of the shade 216.

In some embodiments, during normal operation, the shade 216 is configured to move independently of the panel 206, so that the shade 216 need not be opened or closed simultaneously with the panel 206. For example, the shade 216 may remain open while the panel 206 is closed. However, in some cases, the shade 216 may be automatically controlled in conjunction with the panel 206, such as, for example, during an automatic panel close operation, as will be discussed in more detail below.

Figure 4:
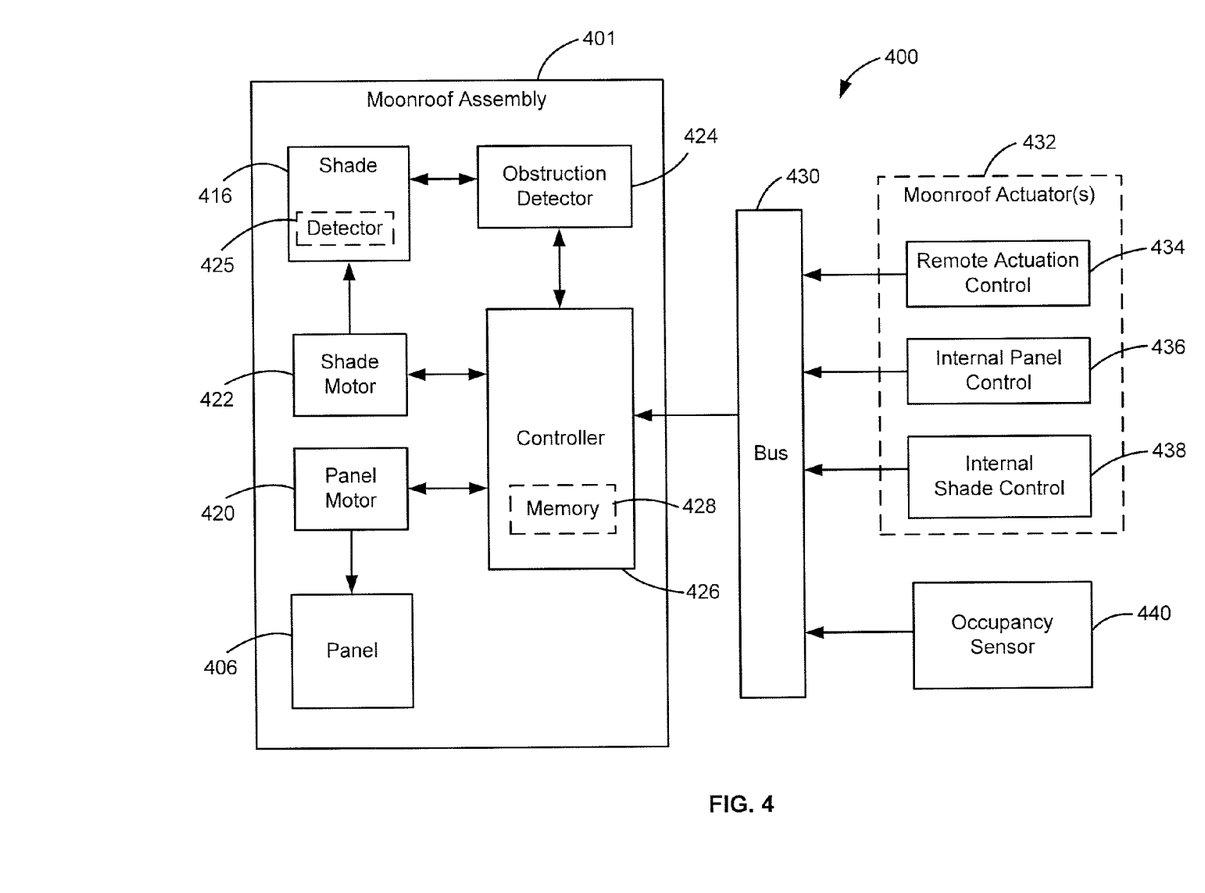
FIG. 4 is a block diagram of an example vehicle moonroof control system according to embodiments.

FIG. 4 depicts an exemplary vehicle roof closure system 400 according to embodiments. In embodiments, the closure system 400 includes a moonroof assembly 401 that is substantially similar to the moonroof assembly 200 shown in FIGS. 2 and 3 and discussed above. In some embodiments, the moonroof assembly 200 is included in the closure system 400 as the moonroof assembly 401. Like the moonroof assembly 200, the moonroof assembly 400 includes a moveable panel 406 and a moveable shade 416 for covering and uncovering an opening in a vehicle roof. The moveable panel 406 may be disposed adjacent to the roof opening, for example, as shown in FIG. 2A and the moveable shade 416 may be disposed below the panel 406, for example, as shown in FIG. 3A. In embodiments, the shade 416 may be a power roll-up shade comprising a flexible fabric wrapped around a rotatable reel, for example, as shown in FIG. 3A. And the panel 406 may be a rigid structure made of, for example, at least partially transparent glass and/or metal.

As shown in FIG. 4, the moonroof assembly 401 further includes a panel motor 420 coupled to the panel 406 for driving the panel 406 lengthwise across the roof opening between a closed position and an open position. The moonroof assembly 401 further includes a shade motor 422 coupled to the shade 416 for moving the shade 416 lengthwise across the roof between a closed position and an open position. The shade motor 422 may be electrically coupled to the rotatable reel of the shade 416 in order to control the rolling and unrolling of the shade 416. As will be appreciated, a minimum output or speed of the panel motor 420 is at least partially determined by a mass of the panel 406 that is to be driven by the motor 420. Likewise, a minimum output or speed of the shade motor 422 is at least partially determined by a mass of the shade 416 that is to be driven by the motor 422. According to embodiments, the mass of the panel 406 can be substantially greater than the mass of the shade 416, for example, where the panel 406 is made of glass and/or metal and the shade 416 is made of flexible fabric. As such, according to embodiments, the shade motor 422 can be configured to have a lower output than the panel motor 420. As an example, the panel motor 420 may have an output of 10 Newton meters (Nm), and the shade motor 422 may have an output 8 Nm. As will be appreciated, a lower output motor may exert less force on any obstructions or obstacles within its path. Thus, by using the lower output motor 422 to drive the shade 416, a smaller amount of force can be placed on any obstructions appearing between the shade 416 and the front end of the roof opening. In some cases, the components of the shade 416 (e.g., fabric, front bar, etc.) can be specifically selected to minimize the mass of the shade 416, so as to also minimize a required output for the motor 422 and thereby, lower the force exerted on any obstructions within a closing path of the shade 416.

As illustrated, the moonroof assembly 401 can further include an obstruction detector 424 for detecting an obstruction or obstacle within the roof opening during a closing operation of the shade 416, or within a closing path of the shade 416. In embodiments, the obstruction detector 424 (also referred to herein as an anti-pinch sensor) provides a final layer of anti-pinch protection, in addition to the shade 416 itself, which exerts a lower force on any obstructions appearing in the closing path of the shade 416 due to the flexible fabric of the shade 416 and the low output motor 422 driving the shade 416. In some embodiments, the obstruction detector 424 becomes activated only during an automatic closing operation of the moonroof assembly 401. In other embodiments, the obstruction detector 424 remains activated during both normal or manual closing operation of the moonroof assembly 401 and the automatic closing operation.

In embodiments, the obstruction detector 424 is positioned relative to a front edge of the shade 416, in order to detect obstructions appearing in the space between the front edge of the shade 416 and a front end of the roof opening. For example, the obstruction detector 424 may be disposed within or adjacent to the front rail 217 of the roof frame 210 shown in FIG. 3A. In some cases, the obstruction detector 424 includes two interacting devices: a first detector device 424 disposed adjacent to the front rail 217, and a second detector device 425 disposed on or in the front edge of the shade 416, as shown in FIG. 4. The exact location of and the number of devices included in the obstruction detector 424 may depend on the type of detection technology included therein. For example, in some embodiments, the obstruction detector 424 may include a pressure sensor that can detect a contact-based obstruction or "pinch" (e.g., due to a change in resistance) between the shade 416 and the obstruction detector 424. In other embodiments, the obstruction detector 424 may include a capacitive sensor or an infrared sensor that can detect a contact-less obstruction (e.g., due to a change in capacitance or infrared radiation) appearing in the space between the shade 416 and the detector 424, or more specifically, between the first detector device 424 and the second detector device 425.

As shown in FIG. 4, the moonroof assembly 401 also includes a controller 426 for controlling operation of the moonroof assembly 401. The controller 426 may include a microprocessor (not shown) having analog and/or digital circuitry for processing control routines and other computer software applications for controlling activation of the moonroof assembly 401. The controller 426 may further include a memory 428 for storing such control routines and software applications, as well as other information related to controlling operation of the moonroof assembly 401. As illustrated, the controller 426 is communicatively coupled to the panel motor 420, the shade motor 422, and the obstruction detector 424. In embodiments, the controller 426 can be configured to control operation of the shade motor 422 and/or the panel motor 420 based on detection information received from the obstruction detector 424, as will be discussed in more detail below.

In embodiments, the closure system 400 further includes a communication bus 430 that is communicatively coupled to the controller 426 for providing various inputs thereto. The communication bus 430 (also referred to as a vehicle bus) may include, or be included in, a central electrical network that internally interconnects various components of the vehicle (e.g., engine control unit, transmission control unit, anti-lock braking system, body control modules, wheel control module, various sensors (e.g., temperature, speed, pressure, etc.), etc.). The communication bus 430 allows these components to communicate, interact, and exchange data with each other. In some instances, the bus 430 may also control one or more of the components within the vehicle.

As illustrated, the closure system 400 can also include one or more moonroof actuators 432, such as, for example, a remote actuation control 434, an internal panel control 436, and an internal shade control or switch 438. In embodiments, the communication bus 430 provides the controller 426 with inputs received from the one or more moonroof actuators 432, such as, for example, inputs to open or close the shade 416 and/or the panel 406. In embodiments, the internal panel control 436 may be a switch or other actuator included within the vehicle cabin to enable local user control of opening and closing the panel 406. Likewise, the internal panel control 438 may be a switch or other actuator included within the vehicle cabin to enable local user control of opening and closing the shade 416. In some embodiments, the internal panel control 436 may further include a panel tilt switch (not shown) and a panel slide switch (not shown). In embodiments, the internal panel control 438 and/or the internal shade control 436 may be utilized to initiate manual closing operation of the moonroof assembly 401.

According to embodiments, the remote actuation control 434 (also referred to as a remote actuator) is included in a key fob (not shown) that includes, for example, one or more buttons for unlocking and locking vehicle doors, opening and closing windows and/or the moonroof, opening the trunk, actuating an alarm, and/or other features. The key fob can be configured to communicate with the bus 430 using radio frequency (RF) signals and can operate only while the user is standing within a predetermined distance away from the vehicle, such as, for example, 100 feet. In some embodiments, the remote actuator 434 may be configured to enable direct user control of the moonroof assembly 401, for example, by opening or closing the panel 406 and/or the shade 416 in response to user selection of one or more buttons on the key fob configured for moonroof control. In such embodiments, the remote actuator 434 may be utilized to initiate normal or manual closing operation of the moonroof assembly 401. In other embodiments, the remote actuator 434 can be configured to enable indirect user control of the moonroof assembly 401, or otherwise carry out an automatic panel closing operation. In such embodiments, the controller 426 may automatically close the panel 406 and/or the shade 416 upon receiving pre-specified information and/or commands from the remote actuator 434 and/or from other vehicle devices. For example, the pre-specified information for initiating the automatic panel closing operation may be an indication that the key is not in the vehicle ignition, and the command may be a user selection of the key fob button for locking the doors. As another example, the pre-specified information for initiating the automatic panel closing operation may be an indication that the key fob is not within close proximity of the vehicle (as will be discussed in more detail below), and the command may be a user selection of the key fob button for closing the windows. The controller 426 may utilize any of a number of other possible combinations of information and/or user commands to initiate an automatic closing operation of the panel 406.

In embodiments, the closure system 400 also includes an occupancy sensor 440 configured to detect an occupant, or passenger, in close proximity to the vehicle, including within the vehicle. In embodiments, the occupancy sensor 440 is configured to output a vehicle occupancy status (for example, an indication that no occupant is detected or an indication that an occupant is detected) to the communication bus 430, and the communication bus 430 may be configured to provide the received vehicle occupancy status as an input to the controller 426. In some cases, the controller 426 may automatically initiate a panel closing operation upon receiving an indication from the occupancy sensor 440 that no occupant is within close proximity (e.g., a negative vehicle occupancy status), determining that the panel 406 is open, and receiving a pre-specified command from the remote actuator 434 (e.g., a close windows command or a lock doors command).

The occupancy sensor 440 may utilize any of a number of different technologies for detecting an occupant within close proximity of, or within, the vehicle. In some embodiments, the occupancy sensor 440 includes a passenger occupant detection system (PODS) that includes a fluid bladder located in a given seat for detecting an occupant based on whether a weight or force is detected on that seat. In other embodiments, the occupancy sensor 440 includes an infrared sensor located in a given vehicle door to sense the presence of an occupant in a seat next to that door. In yet another embodiment, the occupancy sensor 440 may be configured to utilize the RF signals provided by the key fob to determine a relative proximity of the key fob, and thereby, the vehicle operator, and based thereon, determine whether the vehicle operator is in close proximity to the vehicle.

In some cases, if the key is in the ignition of the vehicle, or the occupancy sensor 440 determines that the key fob is within close proximity (e.g., 3 feet or less), the key fob may operate according to an attended functionality protocol, wherein key fob control of the panel 406, the shade 416, and/or other features are disabled. However, if the occupancy sensor 440 determines that the key fob is far away from the vehicle (for example, if the vehicle operator is inside her home), the key fob may operate accorded to an unattended functionality protocol, wherein the key fob can be used to remotely close the panel 406. In other embodiments, the key fob may directly provide presence or proximity information to the controller 426 through the communication bus 430, and based thereon, the controller 426 may determine whether to apply attended functionality or unattended functionality.

Referring now to FIGS. 5A-5F, shown are example operational states for a moonroof assembly 500, according to embodiments. In embodiments, the moonroof assembly 500 may be substantially similar to the moonroof assembly 200 shown in FIGS. 2 and 3 and/or the moonroof assembly 401 shown in FIG. 4. For example, like the moonroof assembly 200, the moonroof assembly 500 includes a moveable panel 506 and a moveable shade 516 for covering and uncovering an opening 508 in a vehicle roof (not shown). Also, similar to the panel 206, the moveable panel 506 may be a rigid structure made of glass and/or metal and positioned adjacent to the opening 508 and above the moveable shade 516. Further, like the shade 216, the shade 516 may be a power roll-up shade comprising a flexible fabric wrapped around a rotatable reel 519. In addition, when in a closed position, the panel 506 adjoins or abuts a front beam 515, similar to the front beam 215 shown in FIG. 2A, and the shade 516 adjoins or abuts a front bar 517, similar to the front rail 217 shown in FIG. 3A.

Further, like the obstruction detectors 424, 425 in the moonroof assembly 401, the moonroof assembly 500 can include one or more detectors 524, 525 for detecting any obstructions within the opening 507 during a closing operation of the shade 516. As with the obstruction detectors 424 and 425, the number of obstruction detectors included in the moonroof assembly 500 can depend on the type of obstruction detection technology being utilized. For example, in some cases, only the detector 524 may be needed to detect obstructions (e.g., if using pressure sensor technology). In other cases, the detectors 524 and 525 may interact with each other to determine whether an obstruction has appeared within the closing path of the shade 516 (e.g., if using IR sensor technology). The illustrated embodiment depicts usage of a contact-less obstruction sensing technology; however, it will be appreciated that the depicted operational states may also apply to contact-based obstruction detection.

In embodiments, the moonroof assembly 500 can be included in the vehicle roof closure system 400 shown in FIG. 4, and operation of the moonroof assembly 500 can be controlled by the controller 426 discussed above. For example, upon receiving appropriate inputs from the moonroof actuators 432, the occupancy sensor 440, and/or the obstruction detectors 524 and/or 525, the controller 426 may instruct the panel motor 406 to move the panel 506 fore or aft, and/or may instruct the shade motor 422 to move the shade 516 fore or aft (e.g., by unrolling or rolling the shade 516).

In some embodiments, the operational states depicted in FIGS. 5A-5F are associated only with an automatic panel closing operation of the moonroof assembly 500, where the panel 506 and/or the shade 516 are automatically closed by the controller 426 in response to certain factors, commands, and/or indications. In other embodiments, the depicted operational states are associated with both the automatic closing operation and a manual closing operation of the moonroof assembly 500, where the panel 506 and/or the shade 516 are closed in response to user operation of one of the moonroof actuators 432. For example, in embodiments, the controller 426 can initiate an automatic panel close operation upon receiving one or more of (1) an indication from the occupancy sensor 440 that no occupant is within the vehicle, (2) a pre-specified command from the remote actuator 434 (e.g., a lock vehicle doors command, a close windows command, etc.), (3) an indication from the vehicle bus 430 that a key is not in the ignition of the vehicle, or (4) an indication that the key fob is a predetermined distance away from the vehicle. Further, the controller 426 can activate normal or manual operation of the moonroof assembly 500 upon receiving one or more of (1) an indication from the occupancy sensor 440 that an occupant is within the vehicle, (2) a close panel command from one of the moonroof actuators 432, (3) an indication from the vehicle bus 430 that the key is in the ignition of the vehicle, or (4) an indication that the key fob is within a close proximity of the vehicle. In some embodiments, a distance is within close proximity of the vehicle as long as the key fob operator has a line of sight to the vehicle and/or the moonroof assembly 401 (e.g., such that the operator can spot obstructions during a closing operation of the panel 406 and, if needed, stop movement of the panel 406). Further, the predetermined distance away from the vehicle may be a distance at which the key fob operator can no longer view the vehicle.

Figure 5A:
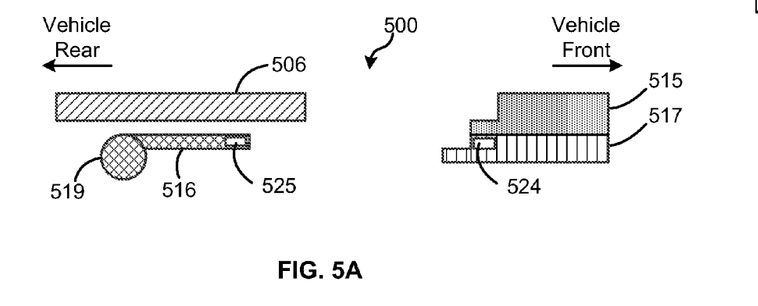
FIGS. 5A-5F depict example operational states of an exemplary vehicle moonroof assembly according to embodiments.
Figure 5B:
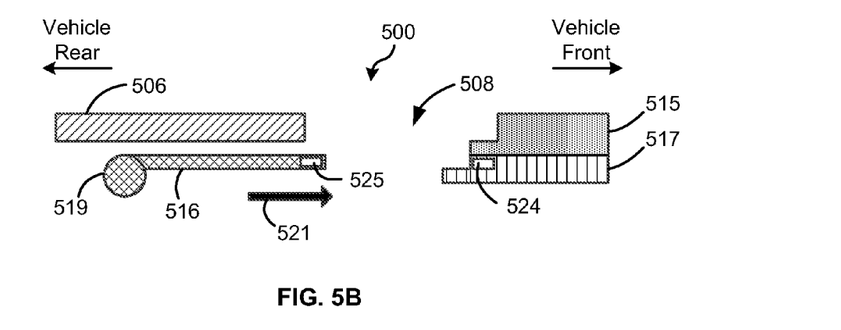
Figure 5C:
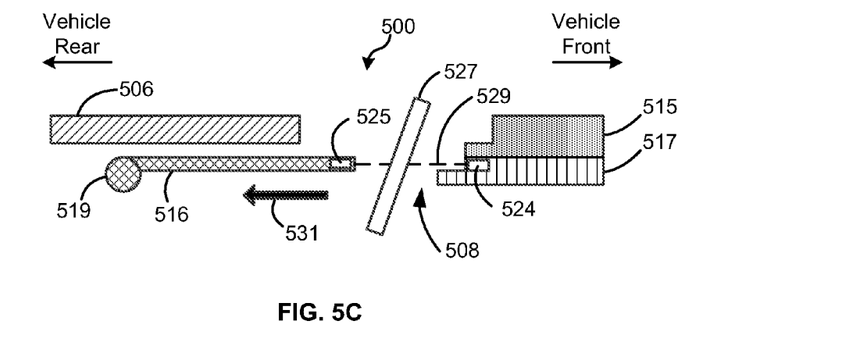
Figure 5D:
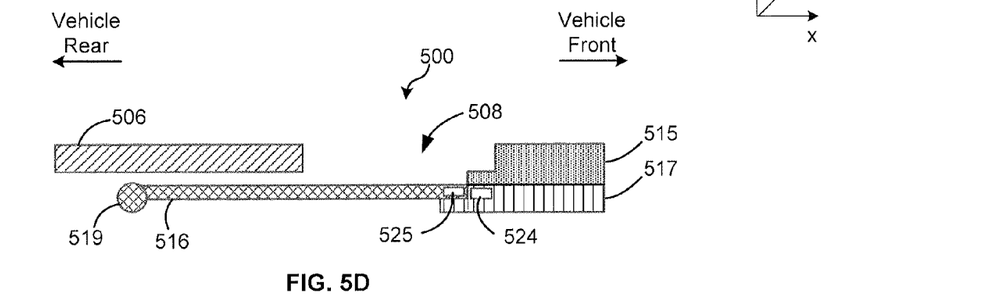
Figure 5E:
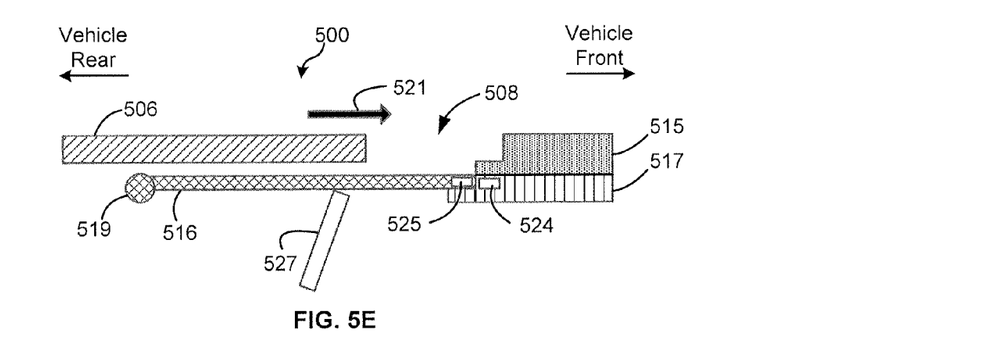
Figure 5F:
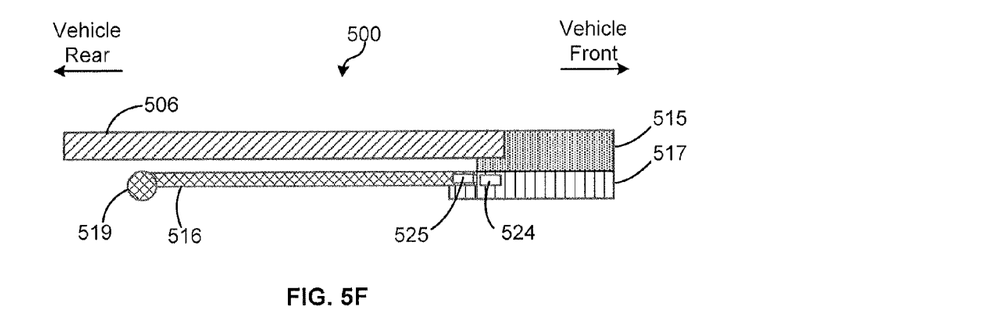

Referring now to FIG. 5A, shown is an all open state of the moonroof assembly 500, where both the panel 506 and the shade 516 are in an open position. As illustrated, the panel 506 extends further into the opening 508 than the shade 516 when both are in the open position. In FIG. 5B, the shade 516 has begun a closing operation by moving, or unrolling, in a closing direction 521 across the opening 508 and past the panel 506. As an example, the closing operation of the shade 516 can be initiated by the controller 426. In embodiments, the controller 426 is configured to actuate the shade motor 422 upon receiving a close panel command from one of the moonroof actuators 432. That is, even though the close panel command requested closure of the panel 506, the controller 426 can be configured to close the shade 516 first, before closing the panel 506. As shown in FIGS. 5B-5D, the panel 506 does not move at all while the shade 516 is closing. The panel 506 begins a closing operation, or moving in the closing direction 521, only after the shade 516 is completely closed, as shown in FIG. 5E. In embodiments, one or more of the detectors 524 and 525 may be configured to sense when the shade 516 is completely closed, as shown in FIG. 5D, and transmit a close panel command to the controller 426. Upon receiving the close panel command, the controller 426 can begin the closing operation of the panel 506, as shown in FIG. 5E, by actuating the panel motor 420. In FIG. 5F, shown is an all closed state of the moonroof assembly 500, where both the panel 516 and the shade 506 are in a closed position.

Referring back to FIG. 5C, shown is an obstruction 527 entering the opening 508 during the closing operation of the shade 516. In embodiments, one or more of the obstruction detectors 524 and 525 can detect the obstruction 527 once it enters a closing path 529 of the shade 516. In embodiments that include both of the obstruction detectors 524 and 525, the closing path 529 includes an obstruction detection area between the obstruction detector 524 and the obstruction detector 525. And in embodiments that include only the obstruction detector 524, the closing path 529 includes an obstruction detection area between the obstruction detector 524 and a front edge of the shade 516. In either case, the obstruction detection area may be the area within which the detector(s) 524 and/or 525 are capable of detecting an obstruction relative to the front edge of the shade 516. In some embodiments, the obstruction detectors 524 and/or 525 may be configured to detect any size or type of obstruction. In other embodiments, the obstruction detectors 524 and/or 525 may be configured to detect only obstructions that are larger than a pre-designated size and/or have a certain density or mass, in order to avoid detection of particles, liquids (e.g., rain), or other small matter as obstructions.

Upon detecting the obstruction 527, the obstruction detector 524 may send a detection signal to the controller 426. Upon receiving the detection signal, the controller 426 may stop the closing operation of the shade 516 by halting operation of the shade motor 422. In some embodiments, the controller 426 may then cause the shade 516 to move in a reverse direction 531 (also referred to herein as an opening direction) by instructing the shade motor 422 to open or roll up the shade 516. In embodiments, the shade 516 may continue in the opening direction 531 until the shade 516 is completely rolled up, or in the open position shown in FIG. 5A. Once the shade 516 returns to the open position, the controller 426 can cause the shade 516 to restart the closing operation shown in FIG. 5B, for example, by actuating the shade motor 422 to unroll the shade 516. In some embodiments, the controller 426 may wait to restart the closing operation of the shade 516 until the obstruction detector 524 sends an all clear signal indicating that no obstructions are detected within the closing path 529. In other embodiments, the controller 426 may automatically restart the closing operation of the shade 516 as long as no new detection signals have been received from the obstruction detector 524.

Referring back to FIG. 5E, shown is the obstruction 527 being effectively blocked by the shade 516 from entering the opening 508 during the closing operation of the panel 508. As illustrated, when in the closed position, the shade 516 provides a protective barrier to the closing path of the panel 506. In some embodiments, the shade 516 completely blocks the opening 508 on all four sides, as the front edge of the shade 516 adjoins the front bar 517 of the roof frame, a back end of the shade 516 is coupled to the reel 519, and the two lateral sides of the shade 516 are coupled to the roof frame (e.g., at opposing sides rails 218, as shown in FIG. 3B). In this manner, the moonroof assembly 500 can prevent accidental pinching of obstructions by the panel 506 without having any obstruction sensors disposed relative to, or adjacent to, the panel 506.

In embodiments, the rotatable reel 519 can be powered by the shade motor 422 shown in FIG. 4. Since the shade 516 is unrolled during a closing operation and rolled up during an opening operation, an amount of fabric wrapped around the rotatable reel 519 can change as the shade 516 moves fore and aft. This can be seen in FIGS. 5A-5D, where the rotatable reel 519 appears largest when the shade 516 is in the open position and gradually becomes smaller during the closing operation of the shade 516, until reaching its smallest size when the shade 516 is in the closed position.

Figure 6:
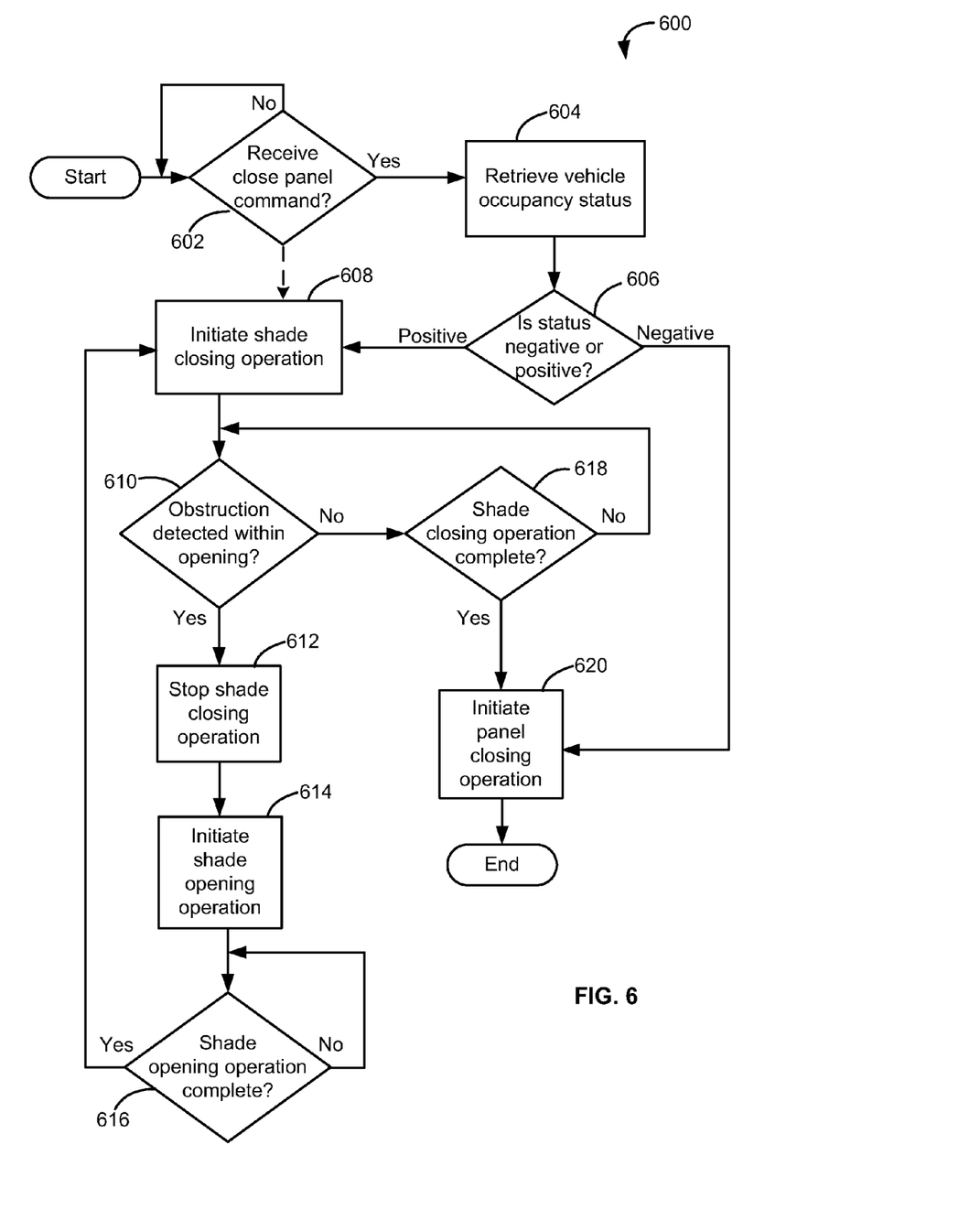
FIG. 6 depicts a flow diagram of an example method utilizing a vehicle moonroof control system according to embodiments.

FIG. 6 depicts a flow diagram of an example method 600 for operating and controlling a vehicle moonroof assembly, such as, for example, the moonroof assembly 200, 401, and/or 500. The moonroof assembly may include a movable panel (such as, e.g., the panel 406 in FIG. 5) disposed above a moveable shade (such as, e.g., the shade 516), the panel and the shade being configured to cover and uncover an opening (such as, e.g., the opening 508) in the vehicle roof (e.g., as shown in FIGS. 2A-2C). According to embodiments, the shade may be a rollable shade comprised of flexible fabric wrapped around a rotatable reel, and the panel may be a rigid structure comprised of glass, metal, or any other suitable material. In embodiments, the vehicle roof closure system 400 can implement the method 600 by having the controller 426 execute logic for implementing the method 600, the logic being stored in the memory 428. In some embodiments, all or portions of the method 600 may be implemented to carry out an automatic panel closing operation of the moonroof assembly. In other embodiments, all or portions of the method 600 may be implemented to carry out a normal or manual closing operation of the moonroof assembly. In some embodiments, portions of the method 600 may be implemented to carry out an unattended closing operation, for example, via user operation of a key fob.

According to embodiments, the method 600 begins with both the panel and the shade in open position, for example, as in the all open state shown in FIG. 5A. At step 602, a determination is made as to whether a close panel command has been received. The close panel command may be a command to close the moonroof panel that is received from a panel actuator (such as, e.g., the remote actuator 434 or the internal panel control 436 in FIG. 4). The close panel command may be a direct command to close the panel (e.g., in association with normal or manual closing operation) or an indirect command to close the panel (e.g., in association with an automatic closing operation). If the determination is negative (e.g., no command has been received), the method 600 continues to check for the close panel command.

In some embodiments, once a close panel command is received, the method 600 continues to step 604, where a vehicle occupancy status is retrieved from an occupancy sensor (e.g., the occupancy sensor 440 in FIG. 4). The vehicle occupancy status indicates whether or not an occupant and/or a key fob has been detected within or near the vehicle. In some cases, the vehicle occupancy status is negative if, for example, the occupancy sensor determines that the key fob is a predetermined distance away from the vehicle (such as, e.g., 100 feet) and/or does not detect any occupants within the vehicle. Likewise, the vehicle occupancy status is positive if, for example, the key is in the ignition or the occupancy sensor determines that the key fob is within close proximity (such as, e.g., less than 3 feet) of the vehicle and/or detects an occupant within the vehicle. In some embodiments, a distance is within close proximity of the vehicle as long as the key fob operator has a direct line of sight to the vehicle and/or the moonroof assembly (e.g., such that the operator can spot obstructions during a closing operation of the panel 406 and, if needed, stop movement of the panel 406).

At step 606, a determination is made as to whether the vehicle occupancy status is positive or negative. If the status is positive (e.g., an occupant is detected), the method 600 continues to step 608, where a shade closing operation is initiated, as will be discussed in more detail below. If the vehicle occupancy status is negative (e.g., no occupant is detected), the method 600 continues directly to step 620, where a panel closing operation is initiated. The panel closing operation may be, for example, the closing operation of the panel 506 depicted in FIG. 5E. In such cases, because no occupant (including the key fob operator) has been detected near the vehicle (e.g., an unattended closing operation), the moonroof assembly may be configured to close the panel without closing the shade first. However, if an occupant (including the key fob operator) is detected near the vehicle during the closing operation (e.g., an attended closing, operation), the method 600 proceeds to step 608 to close the shade first, so as to avoid any unintentional pinching of obstructions by the panel. According to some embodiments, if a vehicle occupancy status cannot be determined (e.g., if the occupancy sensor and/or the key fob is not operating properly or is unable to communicate with the communication bus), then the vehicle occupancy status may automatically be set to positive and the method 600 may automatically continue to step 608 to close the shade first.

In other embodiments, the method 600 may proceed from step 602 directly to step 608, without considering the vehicle occupancy status. The shade closing operation at step 608 may be, for example, the closing operation of the shade 516 depicted in FIG. 5B. At step 610, a determination is made as to whether an obstruction has been detected within the roof opening (such as, e.g., the obstruction 527 in FIG. 5C). If an obstruction has been detected (e.g., the determination is "Yes"), the method 600 continues to step 612, where the shade closing operation is stopped, and to step 614, where a shade opening operation is initiated. The shade opening operation may be, for example, the opening operation of the shade 516 depicted in FIG. 5C. From step 614, the method 600 continues to step 616, where a determination is made as to whether the shade opening operation is complete. In some embodiments, a shade open signal is generated by, for example, the shade motor 422 and/or the obstruction detector 424, 425 once the shade is completely opened, and sent to the controller 426. If the opening operation is not complete, the method 600 continues to check the status of the shade opening operation until the shade is completely opened (or the shade open signal is received). Once the opening operation is complete, the method 600 reverts back to step 608, where the shade closing operation is restarted and the remaining steps of the method 600 are repeated.

If no obstruction is detected at step 610 (e.g., a determination of "No"), the method 600 continues to step 618, where a determination is made as to whether the shade closing operation is complete. In some embodiments, a shade closed signal is generated by, for example, the shade motor 422 and/or the obstruction detector 424, 425 once the shade is completely closed. If the closing operation is not complete, the method 600 continues to check the status of the shade closing operation until the shade is completely closed (or the shade closed signal is received). Once the closing operation is complete, the method 600 continues to step 620, where the panel closing operation is initiated. The panel closing operation may be, for example, the closing operation of the panel 506 shown in FIG. 5E. The method 600 may end once the panel is completely closed, as shown in FIG. 5F.

Thus, the systems and methods disclosed herein provide a moonroof, or sunroof, closure system that uses a two-step closing operation to prevent accidental pinching of obstructions within the roof opening, the first step including closing, or unrolling, a shade to completely cover the roof opening and the second step including closing a panel disposed above the shade. In embodiments, the shade, itself, serves as a protective barrier for preventing, or minimizing the impact from, pinching. For example, because the shade is constructed of a lightweight material and therefore, can be driven by a low output motor, any obstruction that is accidentally pinched during a closing operation of the shade will experience a low, harmless impact. Further, the shade is made of a flexible fabric that can bend or flex around any obstruction impacting the shade, which further reduces the force exerted on the obstruction. Moreover, the shade is secured to side rails disposed along the sides of the roof opening, such that obstructions cannot enter the roof opening through the sides of the shade during a closing operation of the panel.

In addition, unlike conventional anti-pinch closure systems, the disclosed embodiments include a pinch sensor, or obstruction detector, placed only at the front end of the roof opening and/or the front edge of the shade. Due to this reduction in the number of pinch sensors within the roof opening, the disclosed moonroof assembly can be less costly and simpler to install and manufacture than conventional moonroof systems. Also, by removing pinch sensors (and the brackets that hold them) from the sides and rear edges of the roof opening, the disclosed moonroof assembly can provide a larger day light opening (DLO), or viewing area through the roof opening, than existing moonroof systems.

Any process descriptions or blocks in the figures, such as FIG. 6, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle comprising:
   a panel disposed adjacent to a roof opening and moveable by a first motor;
   a shade disposed below the panel and moveable by a second motor having a low harmless impact output lower than the first motor; and
   a controller configured to:
      during a close panel operation, close the shade before closing the panel, and
      stop the shade if an obstruction is detected within the opening.

2. The vehicle of claim 1, wherein closing the shade includes unrolling the shade to cover the opening.

3. The vehicle of claim 1, wherein the controller is further configured to open the shade after stopping the shade.

4. The vehicle of claim 1, wherein the controller is further configured to retrieve a vehicle occupancy status, and initiate closing of the shade only if the vehicle occupancy status is positive.

5. The vehicle of claim 1, further including an occupancy sensor configured to detect an occupant in close proximity to the vehicle and to determine a vehicle occupancy status based thereon.

6. The vehicle of claim 1, wherein the shade includes a flexible fabric.

7. The vehicle of claim 1, further comprising a pair of opposing side rails disposed adjacent to the opening for slidably receiving respective sides of the rollable shade.

8. The vehicle of claim 1, wherein the close panel operation is initiated upon receiving a command from an actuator configured to enable remote user control of the panel.

9. The vehicle of claim 1, wherein the close panel operation is automatically initiated by the controller upon receiving a pre-designated indication.

10. The vehicle of claim 1, further comprising an obstruction detector positioned relative to a front edge of the shade.

11. The vehicle of claim 10, wherein the obstruction detector is a pressure sensor disposed adjacent to a front end of the opening, the front end receiving the front edge of the shade.

12. The vehicle of claim 10, wherein the obstruction detector is a capacitive sensor configured to detect an obstruction between the front edge of the shade and a front end of the opening.

13. A method of controlling a vehicle roof closure, comprising:
   upon receiving, at a processor, a command to close a panel over an opening, causing a shade motor to start closing a shade below the panel by unrolling the shade only if an occupancy status is positive;
   stopping the shade motor upon detection of an obstruction within the opening; and
   upon receiving a shade closed signal, causing a panel motor to start closing the panel.

14. The method of claim 13, further comprising causing the shade motor to open the shade after stopping the shade motor.

15. The method of claim 13, wherein the shade includes a flexible fabric.

16. The method of claim 13, wherein the command is received from an actuator configured to enable remote user control of the panel.

17. The method of claim 13, wherein the command is included in a command to automatically close the panel.

18. The method of claim 13, wherein the panel motor has a higher output than the shade motor.

* * * * *